US006961905B1

(12) United States Patent
Cover et al.

(10) Patent No.: US 6,961,905 B1
(45) Date of Patent: Nov. 1, 2005

(54) METHOD AND SYSTEM FOR MODIFYING AN IMAGE ON A WEB PAGE

(75) Inventors: Steven Andrew Cover, Redmond, WA (US); Daniel Gwozdz, Issaquah, WA (US); Susan Pappalardo, Kirkland, WA (US); Momin Al-Ghosien, Redmond, WA (US); Dorothy Al-Ghosien, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 09/599,999

(22) Filed: Jun. 23, 2000

(51) Int. Cl.$^7$ ............................ G06F 3/00; G06F 15/16
(52) U.S. Cl. ..................... 715/760; 715/748; 715/822; 709/219
(58) Field of Search ................................ 345/744, 760, 345/810, 838, 764; 707/500, 501.1, 513; 715/500, 501.1, 513, 764, 760, 810, 838, 715/748, 822

(56) References Cited

U.S. PATENT DOCUMENTS

| | | | | |
|---|---|---|---|---|
| 5,727,156 A | * | 3/1998 | Herr-Hoyman et al. | 709/219 |
| 6,023,269 A | * | 2/2000 | Matsuo | 345/748 |
| 6,085,195 A | * | 7/2000 | Hoyt et al. | 707/10 |
| 6,151,609 A | * | 11/2000 | Truong | 715/505 |
| 6,343,302 B1 | * | 1/2002 | Graham | 715/501.1 |
| 6,516,339 B1 | * | 2/2003 | Potts et al. | 709/203 |
| 6,591,295 B1 | * | 7/2003 | Diamond et al. | 709/217 |
| 2001/0011275 A1 | * | 8/2001 | Lin et al. | 707/9 |

OTHER PUBLICATIONS

Netscape Commnicator / Composer v. 4.61 (Screendumps of Netscape Communicator v. 4.61, 1999, pp. 1-6).*
Netscape Commicator/Composer v. 4.61 and Prizm Plug-in 2.1 (Screendumps; pp. 1-3; 1999 and 1998 respectively).*
Prizm Plug-in Personal Edition 2.1 (Mar. 1998; pp. 1-2; information printed from FreeDownloads Center website).*
Microsoft PhotoDraw 2000 Fasts Facts, Microsoft Office, Oct. 1998, preliminary unpublished document, pp. 1-4.
Microsoft PhotoDraw 2000 Fast Facts, Microsoft Office, Oct. 1998, downloaded from Microsoft.com, published 2000.
Microsoft PhotoDraw 2000 Tour, Microsoft Office, downloaded from Microsoft.com, published 2000, pp. 1-6.
Part of NS 2000, NetStudio tutorial, downloaded Mar. 28, 2000.

* cited by examiner

Primary Examiner—Sy D. Luu
(74) Attorney, Agent, or Firm—Shook, Hardy & Bacon, L.L.P.

(57) ABSTRACT

An editing program establishes communication with a remote computer using an Internet protocol, downloads a web page containing one or more imported images and displays the web page on a user interface. As the user moves a cursor over an imported image, its appearance may change. The user may select an imported image to edit directly from the displayed web page. In response to the user selecting an image, the editing program presents the image in an editing interface for modification by the user. The image may then be saved back to its original location according to write access permissions.

26 Claims, 9 Drawing Sheets

METHOD AND SYSTEM FOR MODIFYING AN IMAGE ON A WEB PAGE

TECHNICAL FIELD

This invention relates generally to image editing and, more particularly, to a method and system for modifying an image on a web page.

BACKGROUND

The appearance of a web page is defined in document written in a particular type of source code called a "markup language." Examples of markup languages include hypertext markup language (HTML) and extended markup language (XML). A markup language has commands and data structures that define the arrangement and content of the web page in a way that is understandable to a web browser. If a digitized photo, spreadsheet or other imported image is to be displayed in the web page, the definition of the image is typically stored in one or more source files outside of the markup language document. To allow a web browser to retrieve and display imported images, the web page may include a reference to the source file or files, such as a pointer or filename.

There are many commercially available web publishing programs that allow a user to create and modify markup language documents with little or no knowledge of the markup language itself. These programs also allow the user to add images to a web page by simply locating the appropriate source files on the local network and adding a reference to them. These programs do not, however, allow the user to select an imported image directly from the web page and open it for editing. Instead, the user must execute a separate specialized application for editing that type of image, locate the source file for the image on the local network, and open it with the specialized application. For example, if a user wants to add special effects to a JPEG image on a page, he or she must know the path of the JPEG source file, open it in a graphics program that handles the JPEG format, add the effects, save the changes on the local network, and add a reference to the updated file to the web page source code.

Current graphics programs, however, are also limited in the sense that they are not capable of communicating using any of the popular networking and transport protocols (hereinafter referred to collectively as "Internet protocols") such as those found in the various implementations of TCP/IP stacks. Therefore, these graphics programs can only work with image files that are stored locally. To edit an imported image of a remotely stored web page, a user has to open a browser, download the page and store it locally. The user must then open locate the source file of the image and open it with the graphics editing program. Once the user has finished editing the image, he or she must save it locally, open the image in a browser, and post it to the remote computer.

SUMMARY OF THE INVENTION

In accordance with the foregoing, a method and system for modifying an image on a web page is provided. According to the method and system, an editing program establishes communication with a remote computer using an Internet protocol, downloads a web page containing one or more imported images and displays the web page on a user interface. As the user moves a cursor over an imported image, its appearance may change. The user may select an imported image to edit directly from the displayed web page. In response to the user selecting an image, the editing program opens the image and allows the user to modify the image in an editing interface. The image may then be saved back to its original location according to write access privileges.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENTS

Figure 1:
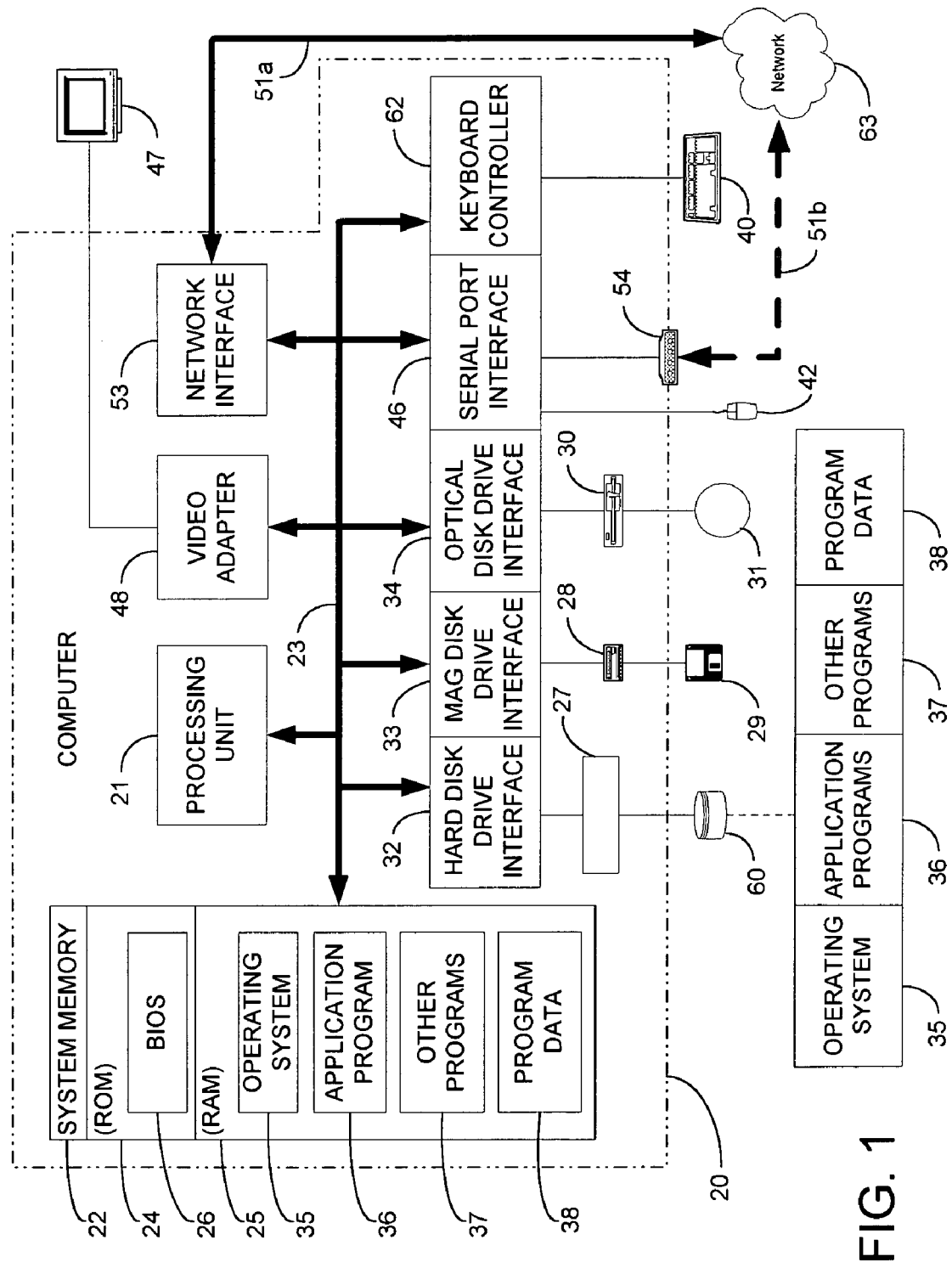
FIG. 1 is a block diagram generally illustrating a computer environment in which the invention may be used.

Turning to the drawings, wherein like reference numerals refer to like elements, an exemplary environment for implementing the invention is shown in FIG. 1. The environment includes a general purpose-computing device 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in the ROM 24. The computing device 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A user may enter commands and information into the computing device 20 through input devices such as a keyboard 40, which is typically connected to the computing device 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computing devices typically include other peripheral output devices, not shown, such as speakers and printers.

The computing device 20 may operate in a networked environment using logical connections to one or more devices within a network 63, including another computing device, a server, a network PC, a peer device or other network node. These devices typically include many or all of the elements described above relative to the computing device 20. The logical connections depicted in FIG. 1 include a land-based network link 51b, for which there are many possible implementations, including a local area network (LAN) link and a wide area network (WAN) link 51b. Land-based network links are commonplace in offices, enterprise-wide computer networks, intranets and the Internet and include such physical implementations as coaxial cable, twisted copper pairs, fiber optics, and the like. Data may transmitted over the network links 51a–51b according to a variety of well-known transport standards, including Ethernet, SONET, DSL, T-1, and the like. When used in a LAN, the computing device 20 is connected to the network 63 through a network interface card or adapter 53. When used in a WAN, the computing device 20 typically includes a modem 54 or other means for establishing communications over the network link 51b, shown by a dashed line. The modem 54, which may be internal or external, is connected to the system bus 23 via the serial port interface 46. In a networked environment, programs depicted relative to the computing device 20, or portions thereof, may be stored on other devices within the network 63.

Those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

In the description that follows, the invention will be described with reference to acts and symbolic representations of operations that are performed by one or more logic elements. As such, it will be understood that such acts and operations may include the execution of microcoded instructions as well as the use of sequential logic circuits to transform data or to maintain it at locations in the memory system of the computer. Reference will also be made to one or more "programs" or "components" executing on a computer system or being executed by parts of a CPU. A "program" or "component" is any instruction or set of instructions that can execute on a computer, or a point of execution within an instruction set, including a process, procedure, function, executable code, dynamic-linked library (DLL), applet, native instruction, module, thread, or the like. A program or component may also include a commercial software application or product, which may itself include several programs or components. However, while the invention is being described in the context of software, it is not meant to be limiting as those of skill in the art will appreciate that various of the acts and operation described hereinafter may also be implemented in hardware.

Figure 2:
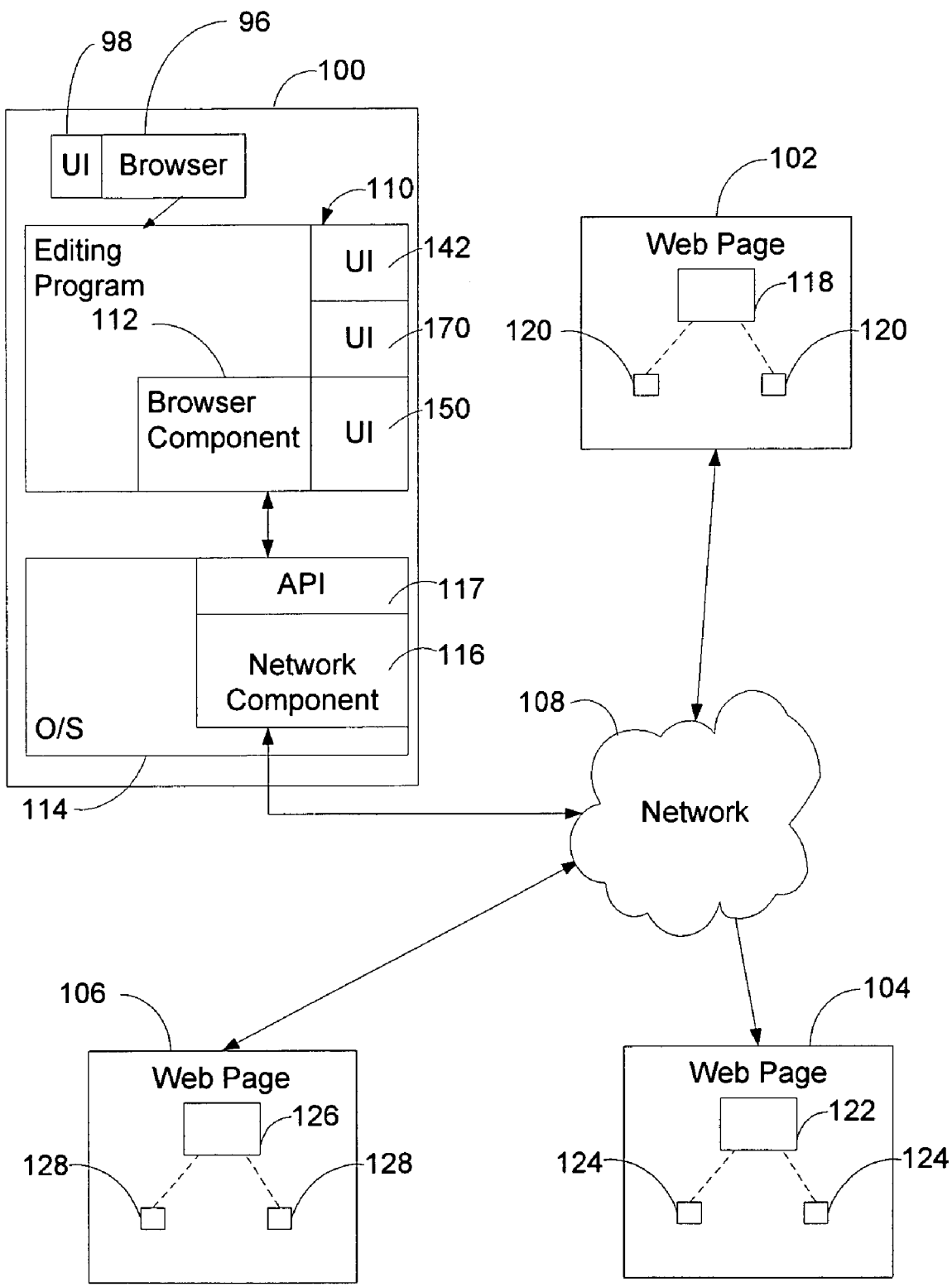
FIG. 2 generally illustrates an example of a networking environment in which an editing program operating in accordance with the invention may be used.

The invention is generally realized as an editing program that allows a user to select an image directly from a displayed web page and modify it in an editing interface. Referring to FIG. 2, an example of a networking environment in which the editing program may be used is illustrated. The editing program, generally labeled 110, executes on a computer 100 that includes an operating system 114 having a networking component 116. The computer 100 may additionally include a browser 96 having a user interface 98. The editing program 110 has a first interface 170, through which it interacts with a user, and a browser component 112. In a preferred embodiment of the invention, the browser component 112 is implemented as an "ActiveX" control, and is the "shdocvw" DLL of MICROSOFT INTERNET EXPLORER. The browser 96 may share the browser component 112 with the editing program 110. The browser 96 may also run independently of the browser component 112. The browser component 112 has a second user interface 150, through which it interacts with a user. The browser component 112 cooperates with the networking component 116 to send and receive network level or transport level messages to and from one or more remote computers 102–106 via a network 108. The network 108 may be any network, such as the Internet, in which one or more networking or transport protocols (collectively referred to herein as "Internet protocols") are used. The network 108 may also be a LAN, WAN or other type of network. The computers 102–106 are referred to as "remote" only to show that they communicate with the computer 100 using networking or transport protocols. They may be any physical distance from the computer 100, however. The networking component 116 may include one or more protocol stacks, such as TCP/IP, and may also include a programming interface 117 for communicating with the browser component 112. The programming interface 117 may be implemented in a variety of ways, including the MICROSOFT "Wininet API" or the "CinternetFile" function of the MICROSOFT FOUNDATION CLASS.

The computers 102–106 each have stored thereon at least one markup language document that defines a web page having at least one imported image. An imported image is any displayable image, including a JPEG, GIF, PCX, bitmap, or other graphic as well as a spreadsheet, table or graph, or the like, that contains data outside of the scope of the markup language in which the web page is written. Specifically, the computer 102 includes a markup language document 118 having references to image source files 120; the computer 104 includes a markup language document 122 having references to image source files 124, and the computer 106 includes a markup language document 126 having references to image source files 128.

In a preferred embodiment of the invention, the editing program 110 may be invoked indirectly, such as from the browser 96, and may be also be invoked directly. If invoked directly, the editing program 110 presents a start-up user interface (UI) 142. The start-up UI 142 prompts the user to select a type of media to be performed by the editing program 110. If the action chosen by the user is to open an element on a web page, the editing program 110 activates the browser component 112. The user may then navigate or browse to a web page. The browser component 112 downloads the markup language document representing the web page from the network 108. The browser component 112 also downloads the image files referred to in the markup language document and displays the web page represented by the markup language document, including the imported image files, on the browser UI 150.

The browser component 112 may parse the markup language source code—the HTML code, for example—to determine whether there any of the imported images are of a type that the editing program 110 can open and edit. This parsing procedure may involve parsing the image tags in the markup of the web page or searching for certain filename extensions, such as JPG, GIF, PNG, XLS (for MICROSOFT EXCEL spreadsheets), or the like. If the user moves the cursor over any of the images identified during the previous parsing operation, the image may change appearance. This allows the user to identify imported images that are capable of being edited by the editing program 110. The user may then select one or more of the imported images directly from the web page and display the images on the editing UI 170. The user may then modify the selected images. If the user has write permission with respect to the remote computer from which the imported images were downloaded, then the user may also store the modified images on the remote computer.

Figure 3:
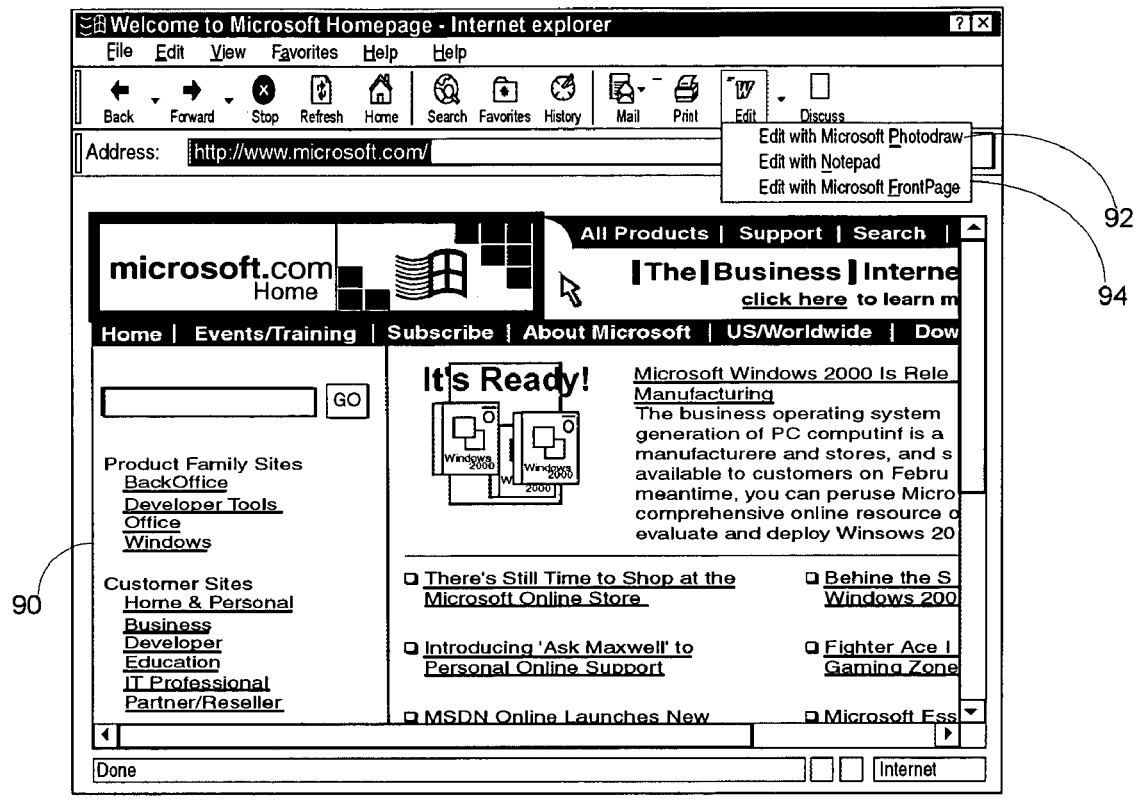
FIG. 3 generally illustrates a web browser interface having a menu selection for opening a web page in the editing program.

A preferred embodiment of the editing program 110 may be invoked from the browser 96 through a pull down menu on the UI 98 as shown in FIG. 3. The pull down menu, labeled 94, has a menu item 92 that allows the user to activate the editing program 110 to open the web page that is currently being viewed in a display area 90. If the menu item 92 is selected, the UI 170 of the editing program 110 is activated with the images of the web page loaded and ready for editing by the user.

Figure 4:
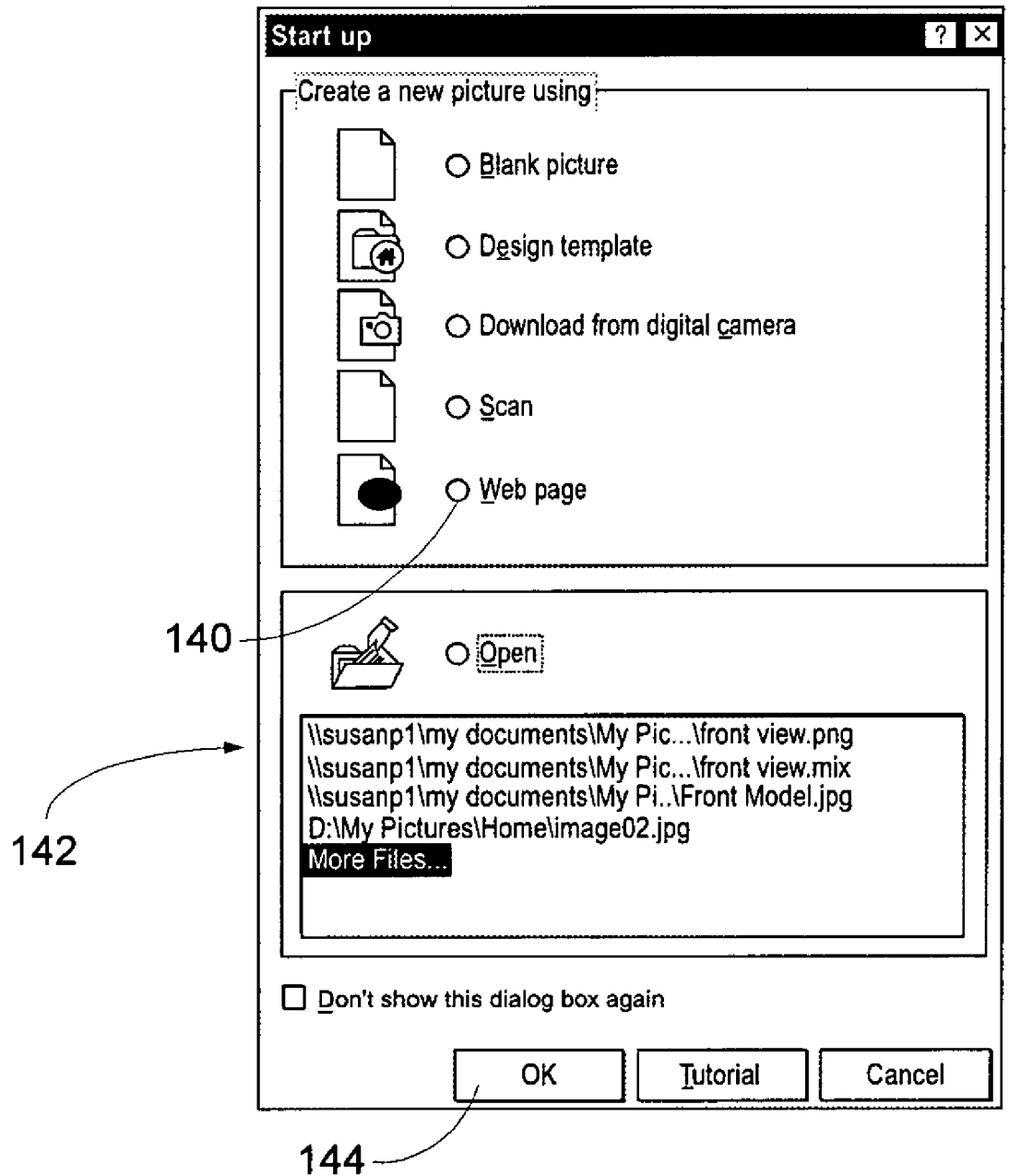
FIG. 4 generally illustrates a preferred embodiment of a start-up interface for the editing program.

As previously noted, a preferred embodiment of the editing program 110 interacts with a user through the user interfaces 142, 150 and 170. Attention is now directed to FIG. 4, in which an embodiment of the start-up interface 142 is shown, FIGS. 5–7, in which an embodiment of the browser interface 150 is shown, and FIG. 8, in which an embodiment of the editing interface 170 is shown. Examples of how a user may interact with these interface embodiments to achieve a certain response from the editing program 110 will also be described.

Referring to FIG. 4, the start-up UI 142 prompts the user to select the method by which an image is to be opened. To open an image from a web page, the user marks a selection field 140 and activates an OK button 144. The editing program 110 (FIG. 3) may then activate the browser component 112, which displays the browser UI 150 (FIG. 5) to the user. The browser UI 150 has a uniform resource locator (URL) entry field 154, a web page display area 157, back and forward buttons 158 and 160, a Go button 155, Open and Cancel buttons 156 and 159, and a cursor 162. The user may navigate to a web page by entering the URL of the web page in the entry field 154 and clicking the Go button 155; activating one or more links on a currently displayed web page; or using the back and forward buttons 158 and 160 in a conventional manner.

Figure 5:
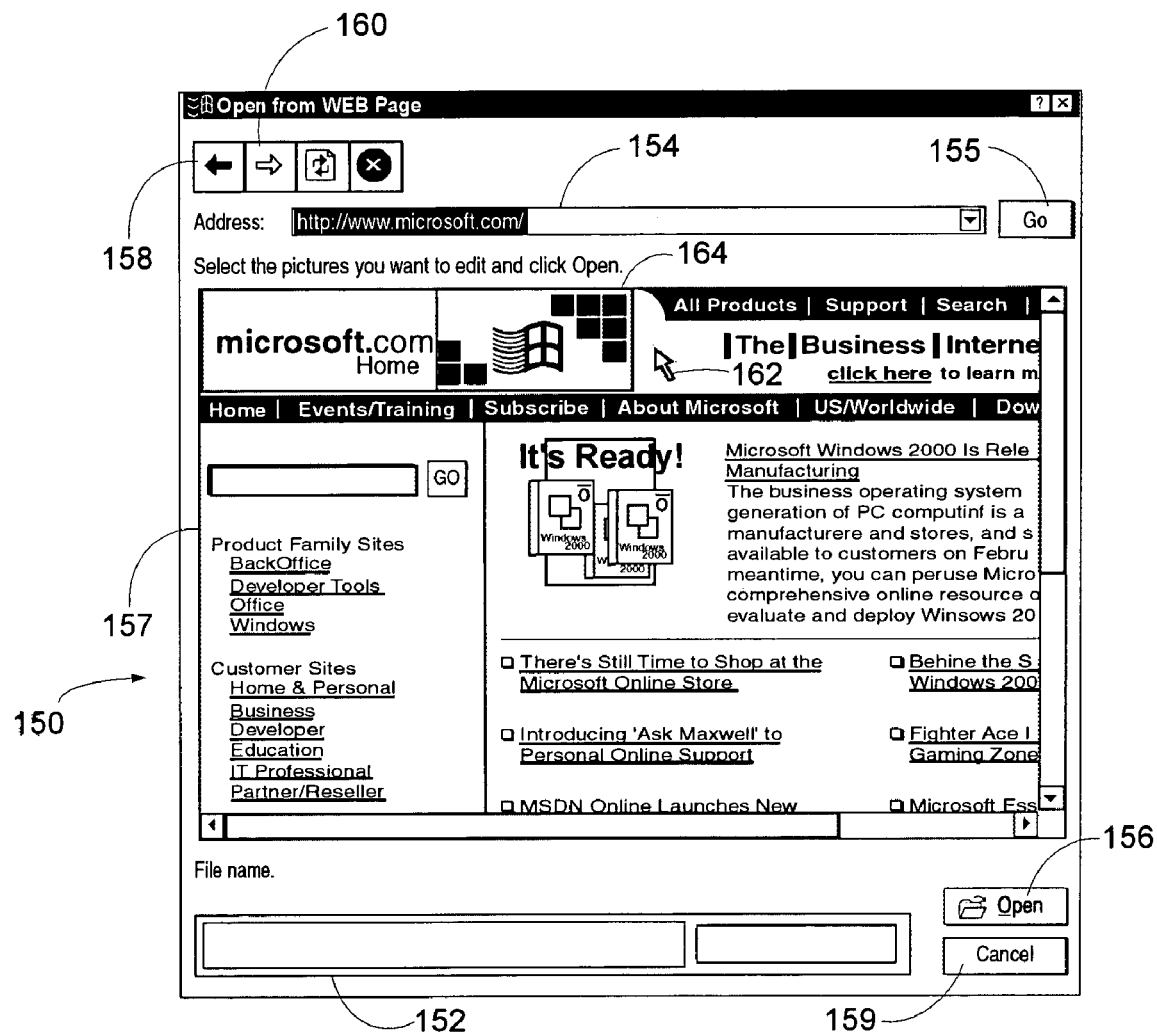
FIGS. 5–7 generally illustrate a preferred embodiment of a browser interface for the editing program.
Figure 6:
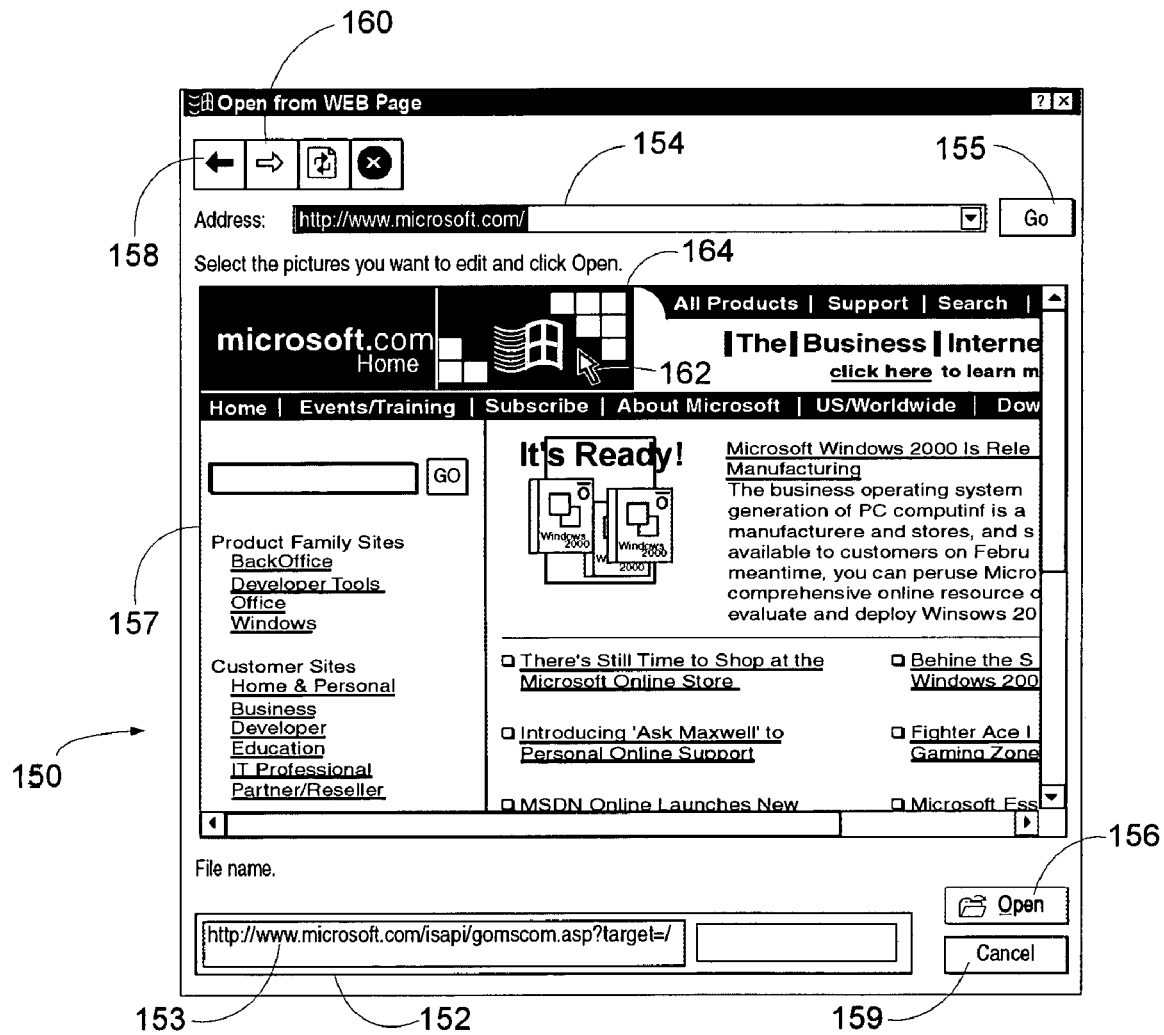

Once the web page is displayed in the display area 157 (FIG. 5), the user may move the cursor 162 over various portions of the displayed web page. When the cursor 162 passes over an editable imported image on the displayed web page, the image changes appearance. Additionally, a textual explanation may be displayed to inform the user that he or she may double-click an image to open it. Double-clicking is a well-known technique for opening files, objects, and the like. The location of the source file for the image is displayed in a path display area 152. For example, as shown in FIG. 6, a web page having several graphical images is displayed in the display area 157, and the cursor 162 is currently over a "Microsoft.com" image 164. The appearance of the graphic 164 changes to a negative image to distinguish it from the rest of the web page, to indicate that it is imported from a file outside of the markup language document, and to indicate that it is editable by the user in the editing program 110 (FIG. 1). A path listing 153 for the graphic 164 is displayed in the path display area 152.

Figure 7:
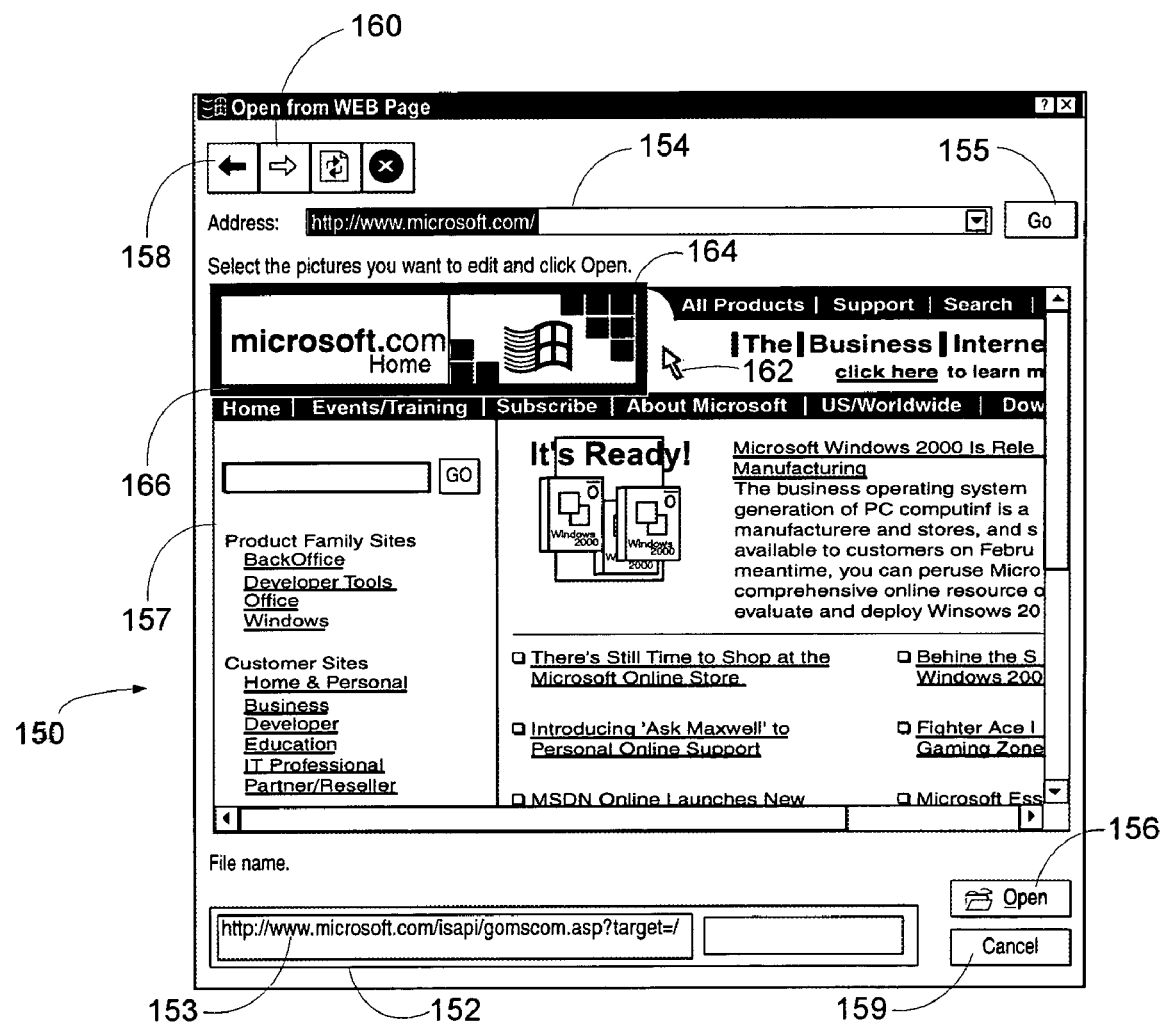

To select an imported image from of the displayed web page to be opened and edited by the editing program 110, the user places the cursor over the image and single-clicks it. The web browser 112 responds by altering the appearance of the image to indicate that it has been selected. For example, if the user single-clicks the image 164 (FIG. 6), the web browser 112 places a highlighted border 166 around it as shown in FIG. 7. The user may select multiple elements of the web page by pressing the CTRL or SHIFT keys while single clicking. The use of the CTRL or SHIFT keys for multiple item selection is a well known feature of the MICROSOFT WINDOWS family of operating systems. The location of each selected element is displayed in the path display area 152. The user may also double-click on an image to open it.

Once the user has selected all of the images that are to be edited, he or she may activate the editing UI 170 (FIG. 2) to open the selected images by pressing the Open button 156 (FIG. 6). Alternatively, if the user double-clicks an image, the image will be opened without requiring the use of the Open button 156. In response, the editing program 110 opens the editing UI 170 and imports the source files for the selected images. Referring to the example embodiment of the UI 170 shown in FIG. 8, the selected images are displayed in a display area 172 in which they may be edited, replaced or otherwise modified. Once the desired modifications have been completed, the user may activate a pull down menu (not shown) from the File command 174 and select "Save." The editing program 110 (FIG. 2) then passes a reference to source files of the modified images to the browser component 112. The browser component then saves the elements back onto the network 108 in their original location, such as through the use of an HTTP "Post" command.

Figure 8:
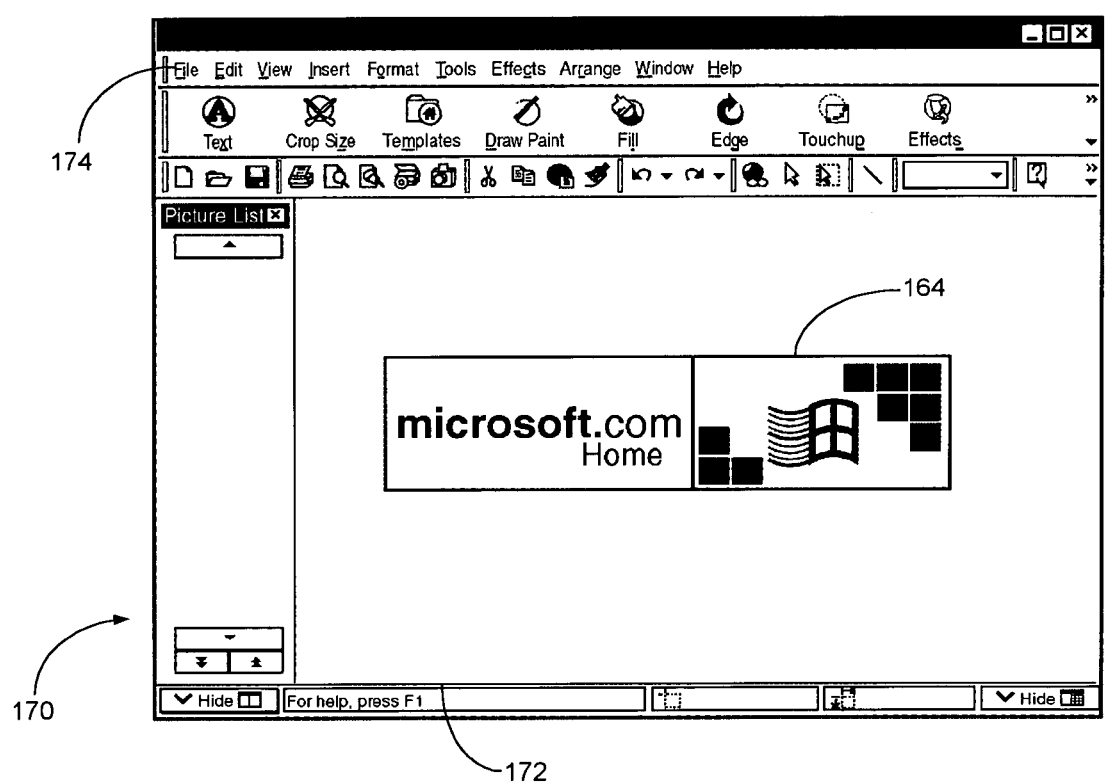
FIG. 8 generally illustrates a preferred embodiment of an editing interface for the editing program.
Figure 9:
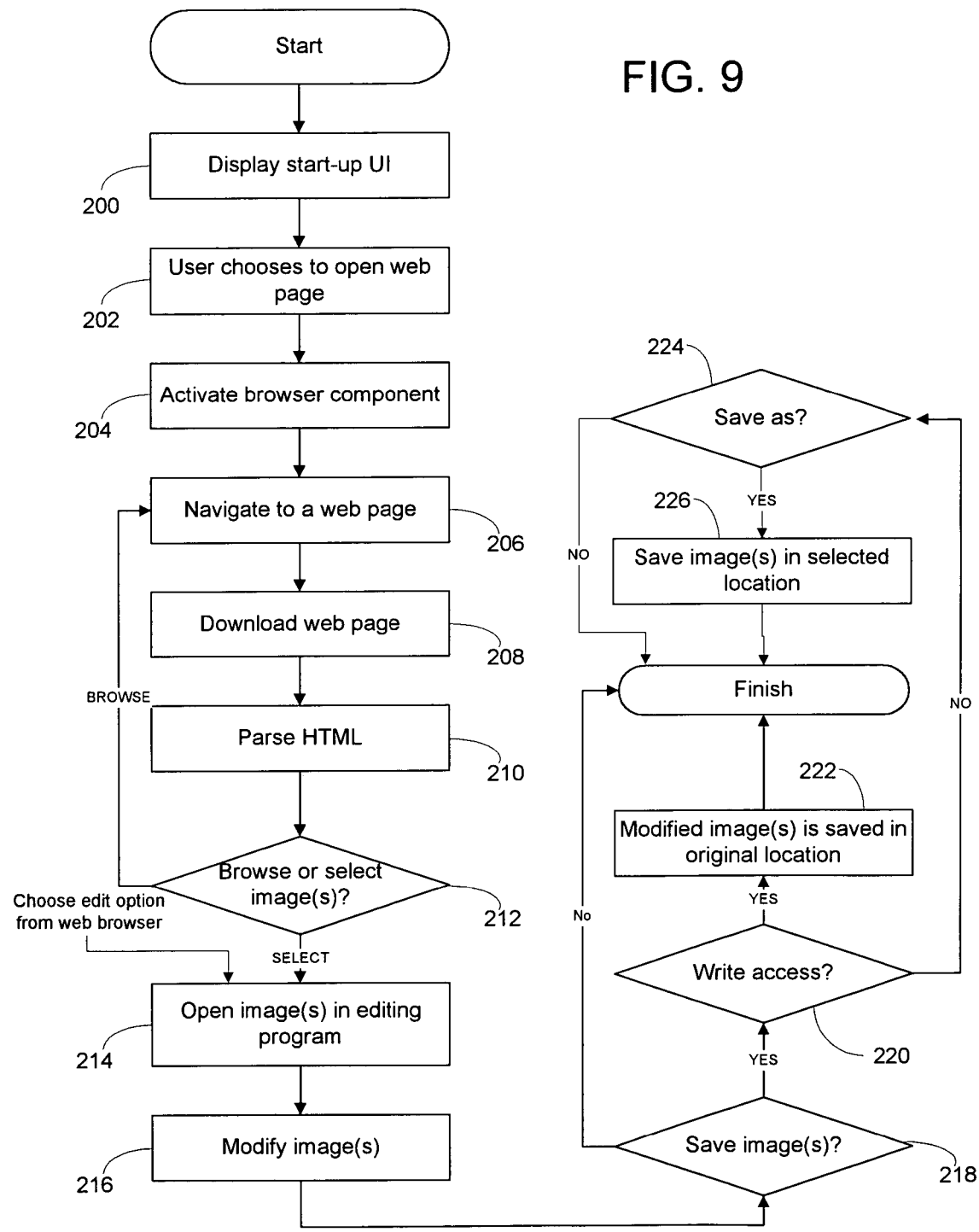
FIG. 9 is a flowchart generally illustrating an example of how a preferred embodiment of the invention may operate.

An example of how a preferred embodiment of the invention may operate will now be described with reference to the flowchart of FIG. 9 as well as with appropriate reference to FIGS. 2–8. In this example, it is assumed that a user at the computer 100 is attempting to edit the image whose data is located in one of the source files 120 of the markup language document 118. It is also assumed that the markup language document 118 is an HTML document representing the "Microsoft.com" web page of FIG. 6, and that the image the user wishes to edit is the image 164.

The process may begin at step 200 if the user invokes the editing program 110 (FIG. 2) directly, but may also begin at step 212 if the user invokes the editing program 110 from an already displayed web page using the menu shown in FIG. 3. At step 200, the editing program 110 (FIG. 2) displays the start-up UI 142 (FIG. 4) to the user. At step 202, the user chooses to open a web page by single-clicking the selection field 140 and clicking the OK button 144. At step 204, the editing program 110 activates the browser component 112, which displays the UI 150 (FIG. 5). At step 206, the browser goes to a web page as specified by the user. In this example, it is assumed that the user types the URL "www.microsoft.com" into the entry field 154 and clicks the Go button 155. At step 208, the browser 112 (FIG. 2) cooperates with the network component 116 via the API 117 to retrieve the markup language document 118 and the image source files 120 from the computer 102. At step 210, the browser 112 parses the HTML source code of the document 118 to determine the existence and location of images that may be edited by the editing program 110. The browser 112 then cooperates with the networking component 116 to retrieve the source files for the images 120 from the computer 102—such as by using an HTTP "Get" command—and displays the web page (FIG. 6). The flow then proceeds to step 212. If the user continues to navigate to another web page, the flow returns to step 206.

If the user chooses an image or images on the web page to edit—such as by single-clicking it and then clicking the Open button 156—the process proceeds to step 214. In this example, it is assumed that the user has selected one or more images to edit. At step 214, the editing program opens the source files of the selected image(s) in the UI 170 (FIG. 8). At step 216, the user modifies the image(s) via the UI 170. This also has the effect of modifying the downloaded source file(s) 120. At step 218, the user is given the option to save the modifications. If the user does not wish to save the modifications, the process ends at step 220. If the user does wish to save the modifications, then at step 220, the editing program 110 attempts to "Post" the modified source file 120—in cooperation with the networking component 116—to the computer 102. If write access to the computer 102 is denied, then the editing program 110 gives the user the option to save the modified file 120 to some other location at step 224. If the user takes this option, then file is saved in the desired location at step 226. If write access to the computer 102 is granted, then the flow proceeds to step 222, at which the modified file 120 is written back onto the computer 102. The process of modifying the image and saving it back to its original location will have been completed.

In can be seen from the foregoing that a new and useful method and system of modifying an image on a web page has been described. In view of the many possible embodiments to which the principals of this invention may be applied, it should be recognized that the embodiments described herein with respect to the drawing figures is meant to be illustrative only and should not be taken as limiting the scope of the invention. It should also be recognized that the various steps involved in carrying out the methods described above as well as the specific implementation of each step described above may be changed in ways that will be apparent to those of skill in the art.

Finally, those of skill in the art will recognize that the elements of the illustrated embodiments shown in software may be implemented in hardware and vice versa, and that the illustrated embodiments can be modified in arrangement and detail without departing from the spirit of the invention. Therefore, the invention as described herein contemplates all such embodiments as may come within the scope of the following claims and equivalents thereof.

We claim:

1. A method of modifying an image on a web page, the method comprising:
    establishing communication with a remote computer using at least one Internet protocol;
    downloading the web page from the remote computer;
    displaying the web page in a web-browser interface;
    in response to the user selecting the image from the displayed web page directly from the web-browser interface, presenting the image in an editing interface for modification by the user; and
    saving the modified image as a modified source file on the remote computer replacing a source file of the image as downloaded.

2. The method of claim 1 wherein the establishing step comprises establishing communication with the remote computer through a TCP/IP stack.

3. The method of claim 1 wherein the establishing step comprises establishing communication with the remote computer using HTTP.

4. The method of claim 1 wherein the establishing step further comprises establishing communication with the remote computer over a public network.

5. The method of claim 4 wherein in the public network is the Internet.

6. The method of claim 1 wherein the web page comprises a plurality of images, and wherein the presenting step further comprises:
    in response to user selection of at least one image of the plurality of images, presenting the selected image in an editing interface for modification by the user.

7. A computer-readable medium having stored thereon computer-executable instructions for performing the steps of claim 6.

8. The method of claim 1 wherein the web page comprises of plurality of images and wherein the presenting step further comprises:
    in response to user selection of a sub-set of the plurality of images, presenting each image of the selected sub-set in an editing interface for modification by the user.

9. The method of claim 1, further comprising:
    determining whether the user has write access on the remote computer; and
    if the user is determined to have write access, saving the modified image as a modified image file on the remote computer.

10. A computer-readable medium having stored thereon computer-executable instructions for performing the steps of claim 9.

11. The method of claim 1, further comprising giving the user the option to open the web page in the editing interface.

12. A computer-readable medium having stored thereon computer-executable instructions for performing the steps of claim 1.

13. A method of modifying an image on a web page, the method comprising:
    downloading a mark-up language document defining the web page from a remote computer;
    downloading a source file of the image, wherein the source file is referenced in the mark-up language document;
    displaying the web page and the image in a web-browser interface according to the definition of the mark-up language document;

changing the appearance of the image as displayed on the web-browser interface in response to a user's selection of the image;

opening the source file of the image directly from the web-browser interface in an editing interface for modification by the user; and saving the modified image as a modified source file on the remote computer replacing the source file of the image as downloaded.

14. The method of claim 13 further comprising:

detecting the location of the cursor on the web-browser interface; and changing the appearance of the image when the cursor is over at least part of the image, thereby distinguishing the image from the rest of the web page.

15. A computer-readable medium having stored thereon computer-executable instructions for performing the steps of claim 14.

16. The method of claim 13 wherein the web page comprises a plurality of images and wherein the changing step further comprises highlighting at least one of the plurality of images in response to a user's selection thereof.

17. A computer-readable medium having stored thereon computer-executable instructions for performing the steps of claim 16.

18. The method of claim 13 wherein the web page comprises a plurality of images and wherein the changing step further comprises, in response to a user's selection of a sub-set of the plurality of images, opening a source file for each image of the selected sub-set in an editing interface for modification by the user.

19. A computer-readable medium having stored thereon computer-executable instructions for performing the steps of claim 18.

20. A computer-readable medium having stored thereon computer-executable instructions for performing the steps of claim 13.

21. A system for modifying an image of a web page, the system comprising:

a means for communicating with a remote computer using at least one Internet protocol;

a means for downloading a web page from the remote computer;

a means for displaying the web page to a user in a web-browsing interface;

a means for selecting the image of the displayed web page;

a means for editing the selected image directly from the web-browsing interface in response to the user selecting the image with the selecting means; and a means for saving a source file of the modified image to the remote computer replacing a source file of the image as downloaded.

22. The system of claim 21 wherein the communicating means is a TCP/IP stack.

23. The system of claim 21 wherein the communicating means is a socket.

24. The system of claim 21 wherein the downloading means is a web browser in cooperating with the communicating means.

25. The system of claim 21 wherein the selecting means is a border graphic drawn around the image in response to the user clicking on the image with a mouse.

26. The system of claim 21 wherein the editing means is a graphic editing program.

* * * * *